(12) United States Patent
Qing et al.

(10) Patent No.: US 12,521,689 B2
(45) Date of Patent: Jan. 13, 2026

(54) CONTINUOUS SYNTHESIS SYSTEM OF UREA

(71) Applicants: Shenzhen Zhonghe Headway Bio-Sci & Tech Co., Ltd., Shenzhen (CN); Harbin Institute of Technology, Shenzhen, Shenzhen (CN)

(72) Inventors: Jing Qing, Shenzhen (CN); Hengzhi You, Shenzhen (CN); Kai Chen, Shenzhen (CN); Quansheng Han, Shenzhen (CN); Guowei Li, Shenzhen (CN); Jingyuan Liao, Shenzhen (CN); Xuelei Jia, Shenzhen (CN); Desheng Dai, Shenzhen (CN)

(73) Assignees: Shenzhen Zhonghe Headway Bio-Sci & Tech Co., Ltd., Shenzhen (CN); Harbin Institute of Technology, Shenzhen, Shenzhen (CN)

( * ) Notice: Subject to any disclaimer, the term of this patent is extended or adjusted under 35 U.S.C. 154(b) by 538 days.

(21) Appl. No.: 18/067,334

(22) Filed: Dec. 16, 2022

(65) Prior Publication Data
US 2023/0158470 A1 May 25, 2023

(30) Foreign Application Priority Data
Jul. 26, 2022 (CN) .......................... 202210881728.4

(51) Int. Cl.
*C07C 273/04* (2006.01)
*B01J 4/00* (2006.01)
(Continued)

(52) U.S. Cl.
CPC ........... *B01J 19/1812* (2013.01); *B01J 4/008* (2013.01); *B01J 19/0013* (2013.01); *B01J 19/0066* (2013.01); *B01J 19/285* (2013.01); *B01J 2204/002* (2013.01); *B01J 2204/007* (2013.01); *B01J 2219/00033* (2013.01);
(Continued)

(58) Field of Classification Search
CPC .... B01J 19/1812; B01J 4/008; B01J 19/0013; B01J 19/0066; B01J 19/285; B01J 2204/002; B01J 2204/007; B01J 2219/00033; B01J 2219/00063; B01J 2219/00162; B01J 2219/00164; B01J 2204/005; B01J 2219/00074; B01J 2219/00159; B01J 4/007; B01J 19/0006; B01J 19/0053; B01J 4/001;
(Continued)

(56) References Cited

U.S. PATENT DOCUMENTS

2019/0185422 A1* 6/2019 Pustjens et al. ...... C07C 273/04

* cited by examiner

*Primary Examiner* — Prem C Singh

(57) ABSTRACT

A continuous synthesis system of urea, including: a reactor, a mixing buffer tank for accommodating a first raw material, a feeding pump for pumping the first raw material to the reactor, a pressure regulating valve connected to the reactor to transfer a second raw material and regulate a pressure of the second raw material, a first heat exchanger connected to the reactor to regulate a temperature inside the reactor to a first preset temperature, and a back pressure valve connected to an end of the reactor away from the feeding pump to maintain a pressure of the continuous synthesis system at a preset pressure. The second raw material is gaseous. The second raw material is fed to the reactor through the pressure regulating valve to react with the first raw material in the reactor to generate a target product.

9 Claims, 2 Drawing Sheets

(51) Int. Cl.
  *B01J 19/00* (2006.01)
  *B01J 19/18* (2006.01)
  *B01J 19/28* (2006.01)
(52) U.S. Cl.
  CPC ............... *B01J 2219/00063* (2013.01); *B01J 2219/00162* (2013.01); *B01J 2219/00164* (2013.01)
(58) Field of Classification Search
  CPC ... B01J 2219/00058; B01J 2219/00065; C07C 273/02
  See application file for complete search history.

CONTINUOUS SYNTHESIS SYSTEM OF UREA

CROSS-REFERENCE TO RELATED APPLICATIONS

This claims the benefit of priority from Chinese Patent Application No. 202210881728.4, filed on Jul. 26, 2022. The content of the aforementioned application, including any intervening amendments thereto, is incorporated herein by reference in its entirety.

TECHNICAL FIELD

This application relates to urea production, and more particularly to a continuous synthesis system of urea.

BACKGROUND

Urea synthesis tower is widely used in the existing urea synthesis process, but it fails to achieve the continuous-flow synthesis. In the synthesis process, a large number of raw materials are required to be introduced at one time, and the large volume of the synthesis tower leads to a small specific surface area (specific surface area-heat exchange area/volume), resulting in poor heat transfer at a center zone of the synthesis tower. Thus, it fails to ensure the product quality and consistency, and will lead to safety risks such as temperature runaway.

SUMMARY

An objective of this application is to provide a continuous synthesis system of urea, which enables the continuous urea synthesis with good heat transfer performance.

Technical solutions of this application are described as follows.

This application provides a continuous synthesis system of urea, comprising:
  a reactor;
  a mixing buffer tank;
  a feeding pump;
  a pressure regulating valve;
  a first heat exchanger; and
  a back pressure valve;
  wherein the mixing buffer tank is configured to accommodate a first raw material;
  one end of the feeding pump is connected to the mixing buffer tank, and the other end of the feeding pump is connected to the reactor; the feeding pump is configured to pump the first raw material in the mixing buffer tank to the reactor;
  the pressure regulating valve is connected to the reactor; the pressure regulating valve is configured to transfer a second raw material to the reactor and regulate a pressure of the second raw material; the second raw material is gaseous; and the reactor is configured for reaction of the first raw material and the second raw material to generate a target product;
  the first heat exchanger is connected to the reactor; and the first heat exchanger is configured to regulate a temperature inside the reactor to a first preset temperature; and
  the back pressure valve is connected to an end of the reactor away from the feeding pump; and the back pressure valve is configured to maintain a pressure of the continuous synthesis system at a preset pressure.

In an embodiment, the reactor is configured to be oscillatable to fully mix the first raw material and the second raw material in the reactor.

In an embodiment, the reactor comprises a first circular tube and a second circular tube; the second circular tube is provided inside the first circular tube; a side wall of the second circular tube is provided with a plurality of through holes; and the first circular tube is configured to be radially swingable to drive the second circular tube to move back and forth inside the first circular tube.

In an embodiment, the mixing buffer tank is provided with an agitating member; and the agitating member is configured to be axially rotatable to agitate the first raw material.

In an embodiment, a one-way valve is provided between the pressure regulating valve and the reactor; and the second raw material is configured to be transferred to the reactor through the pressure regulating valve and the one-way valve in sequence.

In an embodiment, the continuous synthesis system further comprises a preheater; a first end of the preheater is connected to the reactor, and a second end of the preheater is connected to the feeding pump; the preheater is connected to the first heat exchanger; and the first heat exchanger is configured to regulate a temperature inside the preheater to the first preset temperature.

In an embodiment, a gas flow controller is provided between the pressure regulating valve and the reactor; and the gas flow controller is configured to control a volumetric flow rate of the second raw material.

In an embodiment, the continuous synthesis system further comprises a separator; wherein one side of a top end of the separator is connected to an end of the back pressure valve away from the reactor, and the other side of the top end of the separator is connected to a tail gas treatment device.

In an embodiment, the continuous synthesis system further comprises a gas condensation dryer; a bottom end of the gas condensation dryer is connected to the top end of the separator, and a top end of the gas condensation dryer is connected to the tail gas treatment device.

In an embodiment, the continuous synthesis system further comprises at least one of a dryer, a cooler, a temperature sensor and a pressure sensor;
  wherein the dryer is provided between the pressure regulating valve and the reactor; and the dryer is configured to dry the second raw material;
  the cooler is provided between the reactor and the back pressure valve; and the cooler is configured to cool the target product output from the reactor;
  the temperature sensor is configured to detect a temperature of the continuous synthesis system;
  the pressure sensor is configured to detect a pressure of the continuous synthesis system.

Compared with the prior art, this application has the following beneficial effects. In the continuous synthesis system of urea, the first raw material is pumped by the feeding pump from the mixing buffer tank to the reactor, and the second raw material is fed to the reactor through the pressure regulating valve. The first raw material is reacted with the second raw material in the reactor to generate the target product. The first heat exchanger is configured to keep the temperature inside the reactor at the first preset temperature required by the reaction. The back pressure valve is configured to maintain the pressure inside the reactor at a preset pressure required by the reaction, so as to ensure the reliable reaction. In addition, the first raw material and the second raw material can be continuously fed to the reactor, and the reactor can continuously output the target product, enabling the continuous-flow synthesis of the target product from raw materials. Moreover, since the target product can be continuously output from the reactor, the reactor can be designed in a smaller volume without influencing the synthesis efficiency. Compared with the prior art, the size of the reactor used herein is optimized to reach a larger specific surface area and enhanced heat transfer performance, thereby avoiding the occurrence of the temperature runaway. Moreover, the synthesis system provided herein enables the continuous synthesis and output of the urea, and thus can ensure the quality consistency of products of different batches.

BRIEF DESCRIPTION OF THE DRAWINGS

In order to clearly explain the technical solutions in the embodiments of the present application or the prior art, the drawings that need to be used in the description of the embodiments or the prior art are briefly described below. Obviously, illustrated in the drawings are merely some embodiments of this application. For those of ordinary skill in the art, other drawings can be obtained based on these drawings without paying creative effort.

Figure 1:
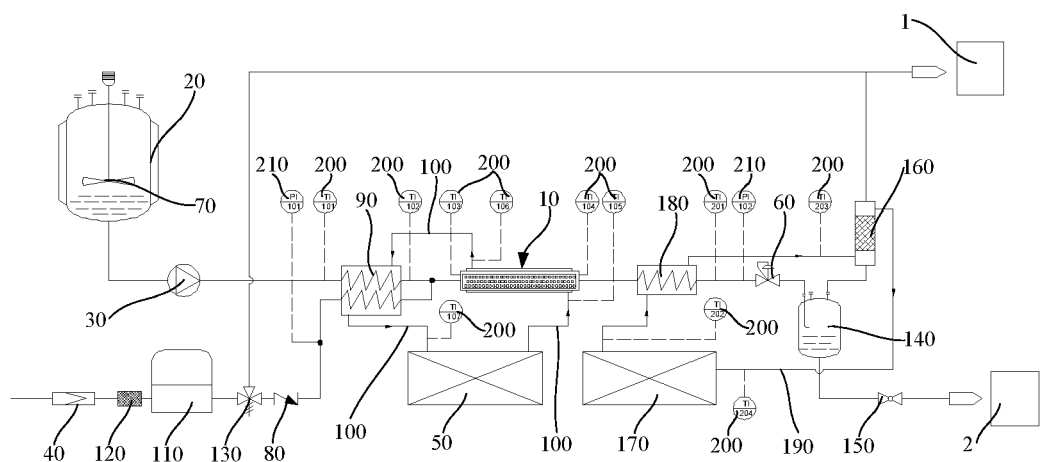
FIG. 1 is a structural diagram of a continuous synthesis system of urea according to an embodiment of this application.

In the drawings, 10, reactor; 11, first circular tube; 12, second circular tube; 1201, through hole; 20, mixing buffer tank; 30, feeding pump; 40, pressure regulating valve; 50, first heat exchanger; 60, back pressure valve; 70, agitating member; 80, one-way valve; 90, preheater; 100, first delivery tube; 110, gas flow controller; 120, dryer; 130, safety valve; 140, separator; 150, ball valve; 160, gas condensation dryer; 170, second heat exchanger; 180, cooler; 190, second delivery tube; 200, temperature sensor; 210, pressure sensor; and 1, tail gas treatment device; and 2, product collecting tank.

This application will be described in detail below with reference to the embodiments and accompanying drawings to make the objectives, functions, and advantages of this application clearer.

DETAILED DESCRIPTION OF EMBODIMENTS

The technical solutions of the disclosure will be described clearly and completely below with reference to the accompanying drawings and embodiments of the disclosure. Obviously, described below are merely some embodiments of the disclosure, and are not intended to limit the disclosure. Other embodiments obtained by those of ordinary skill in the art based on the embodiments provided herein without paying creative effort shall fall within the scope of the present disclosure defined by the appended claims.

It should be noted that as used herein, directional indications (such as up, down, left, right, front and back) are merely intended to explain the relative position relationship and movement situation among individual components in a specific posture (as shown in the accompanying drawings). If the specific posture changes, the directional indication changes accordingly. In addition, relational terms such as "first" and "second" are merely used for description, and cannot be understood as indicating or implying their relative importance or the number of indicated technical features. Thus, the features defined with "first" and "second" may explicitly or implicitly include at least one of the features.

Additionally, "and/or" in the disclosure includes three solutions. For example, A and/or B includes technical solution A, technical solution B, and a combination thereof. Additionally, technical solutions of various embodiments can be combined on the premise that the combined technical solution can be implemented by those skilled in the art. When the combination of technical solutions is contradictory or cannot be implemented, it should be considered that such a combination of technical solutions does not exist, and does not fall within the scope of the present disclosure.

Referring to an embodiment shown in FIG. 1, a continuous synthesis system of urea includes a reactor 10, a mixing buffer tank 20, a feeding pump 30, a pressure regulating valve 40, a first heat exchanger 50 and a back pressure valve 60. The mixing buffer tank 20 is configured to accommodate a first raw material. One end of the feeding pump 30 is connected to the mixing buffer tank 20, the other end of the feeding pump 30 is connected to the reactor 10. The feeding pump 30 is configured to pump the first raw material to the reactor 10. The pressure regulating valve 40 is connected to the reactor 10. The pressure regulating valve 40 is configured to transfer the second raw material to the reactor 10 and regulate a pressure of the second raw material. The second raw material is gaseous. The second raw material is transferred to the reactor 10 through the pressure regulating valve 40 and reacts with the first raw material in the reactor 10 to generate a target product. The first heat exchanger 50 is connected to the reactor 10. The first heat exchanger 50 is configured to regulate a temperature inside the reactor 10 to a first preset temperature. The back pressure valve 60 is connected to an end of the reactor 10 away from the feeding pump 30. The back pressure valve 60 is configured to maintain a pressure of the continuous synthesis system at a preset pressure.

The first raw material is pumped by the feeding pump 30 from the mixing buffer tank 20 to the reactor 10, and the second raw material is fed to the reactor 10 through the pressure regulating valve 40. The first raw material and the second raw material are allowed to react in the reactor 10 to generate the target product. The first heat exchanger 50 is provided to keep the temperature inside the reactor 10 at the first preset temperature required by the reaction. The back pressure valve 60 is configured to maintain a pressure inside the reactor 10 at a preset pressure required by the reaction, so as to ensure the reliable reaction. In addition, the first raw material and the second raw material can be continuously fed to the reactor 10, and the reactor 10 can continuously output the target product, enabling the continuous-flow synthesis of the target product from raw materials. Moreover, since the target product can be continuously output from the reactor, the reactor 10 can be designed in a smaller volume without influencing the synthesis efficiency. Compared with the prior art, the size of the reactor 10 used herein is optimized to reach a larger specific surface area and enhanced the heat transfer performance, thereby avoiding the occurrence of the temperature runaway.

Specifically, since specific surface area is obtain by dividing volume into heat transfer area, the smaller the volume and the larger the specific surface area, the better the heat transfer performance of reactor 10.

In this embodiment, the first raw material is methanolamine and sulfur powder. Specifically, the sulfur powder is mixed in methanolamine to form a suspension. The second raw material is carbon monoxide gas, and the target products are urea and hydrogen sulfide gas. In the actual scheme, the target products also contain ammonia gas and small amounts of unreacted sulfur powder and unreacted solvent. That is, the continuous synthesis system of urea provided herein enables continuous-flow synthesis of urea. In other embodiments, the continuous synthesis system provided herein is capable of preparing other products. When the continuous synthesis system provided herein is applied to production of other products, the types of the raw materials can be varied, and the raw material can be gaseous, liquid, and/or solid.

In this embodiment, the second raw material is carbon monoxide gas. The carbon monoxide gas is fed by a carbon monoxide tank. In this embodiment, since the carbon monoxide gas in the carbon monoxide gas tank has a relatively high pressure, the pressure of the carbon monoxide output from the carbon monoxide tank is reduced by adjusting the pressure regulating valve 40.

In this embodiment, when a pressure of the back pressure valve 60 in the continuous synthesis system is lower than the preset pressure, the back pressure valve 60 is in a blocking state, such that the pressure of the continuous synthesis system is gradually increased with the feeding process. When the pressure of the continuous synthesis system reaches the preset pressure, the back pressure valve 60 is in a conducting state, such that the target product in the system is allowed to be discharged through the back pressure valve 60, thereby maintaining the back pressure valve 60 at the preset pressure.

In an embodiment, the second raw material is $^{13}CO$, and the target product is $^{13}C$-urea. In this embodiment, the $^{13}CO$ is mixed with an inert gas to reduce its concentration. On one hand, even though the concentration of $^{13}CO$ is reduced, the reaction can still be completed. On the other hand, the $^{13}CO$ is very expensive, and can avoid incomplete reaction of a large amount of the $^{13}CO$ after mixed with the inert gas, so as to lower the cost.

In this embodiment, the first preset temperature is 40-120° C., and the preset pressure is 1-2 MPa.

In this embodiment, the reactor 10 is configured to be oscillatable to fully mix the first raw material and the second raw material. Specifically, the reactor 10 oscillates to make the first raw material thoroughly contacted with the second raw material, so as to fully mix the first raw material and the second raw material.

Figure 2:
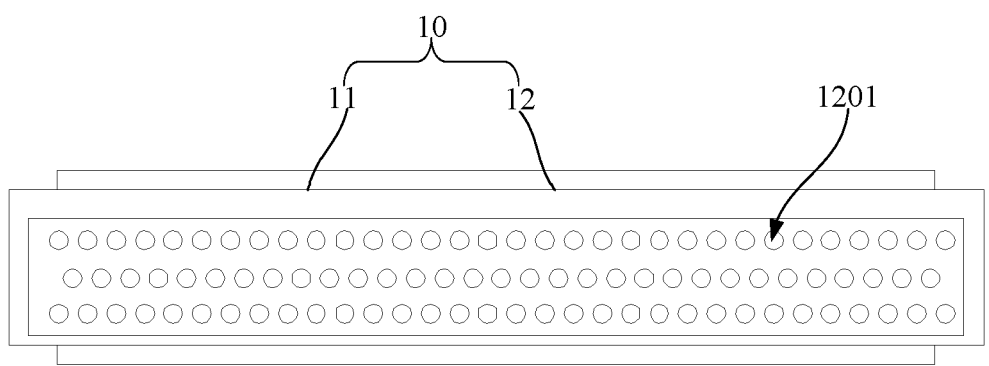
FIG. 2 is a structural diagram of a reactor to an embodiment of this application.

In an embodiment, as shown in FIGS. 1 and 2, the reactor includes a first circular tube 11 and a second circular tube 12. The second circular tube 12 is provided inside the first circular tube 11. A side wall of the second circular tube 12 is provided with a plurality of through holes 1201. The first circular tube 11 is configured to be radially swingable to drive the second circular tube 12 to move back and forth inside the first circular tube 11. Specifically, when the first circular tube 11 is swinged, the second circular tube 12 inside the first circular tube 11 is configured to move back and forth, such that the second raw material inside the first circular tube 11 will be fully sheared by the plurality of through holes 1201 on the side wall of the second circular tube 12, forming a plurality of tiny bubbles. The tiny bubbles greatly increase the contact area between the first raw material and the second raw material, so as to make the first raw material fully react with the second raw material. In this embodiment, during a in the resting state, an axis of the first circular tube 11 is parallel to an axis of the second circular tube 12.

In an embodiment, as shown in FIG. 1, the mixing buffer tank 20 is provided with an agitating member 70. The agitating member 70 is configured to be axially rotatable to agitate the first raw material. In this embodiment, the first raw material is a suspension formed by mixing sulfur powder in methanolamine. The agitating member 70 is configured to make the sulfur powder evenly dispersed in the methanolamine to form a uniform suspension, so as to achieve uniform feeding, thereby avoiding the incomplete reaction or by-product formation due to uneven feeding.

Referring to the embodiment shown in FIG. 1, a one-way valve 80 is provided between the pressure regulating valve 40 and the reactor 10. The second raw material is configured to be transferred to the reactor 10 through the pressure regulating valve 40 and the one-way valve 80 in sequence, and is not allowed to be returned from the reactor 10 through the one-way valve 80. The cooperation of the one-way valve 80 and the back pressure valve 60 keeps the pressure in the continuous synthesis system to be more reliably at the preset pressure. More importantly, the pressure in the reactor 10 is reliably maintained at the preset pressure by the cooperation of the one-way valve 80 and the back pressure valve 60.

Referring to the embodiment shown in FIG. 1, the continuous synthesis system further includes a preheater 90. A first end of the preheater 90 is connected to the reactor 10, and the second end of the preheater 90 is connected to the feeding pump 30. The preheater 90 is connected to a first heat exchanger 50. The first heat exchanger 50 is configured to regulate a temperature in the preheater 90 to the first preset temperature. Specifically, the preheater 90 is provided to heat the first raw material and the second raw materials to a temperature required for the reaction inside the preheater 90 before entering the reactor 10, thereby the first raw material and the second raw material are allowed to be reacted with each other after entering the reactor 10, improving the reaction efficiency. In this embodiment, the second end of the preheater 90 is connected to the feeding pump 30 and the one-way valve 80, respectively. The one-way valve 80 is connected to the reactor 10 through the preheater 90. The preheater 90 is a tubular preheater 90. The second end of the preheater 90 away from the reactor 10 is connected to the feeding pump 30 and the one-way valve 80 respectively.

Referring to the embodiment shown in FIG. 1, the continuous synthesis system includes a first delivery tube 100. Both two ends of the first delivery tube 100 are respectively connected to the first heat exchanger 50 to form a circulation loop. A middle portion of the first delivery tube 100 is in contact with an outer side wall of the preheater 9 and an outer side wall of the reactor 10. The first heat exchanger 50 is configured to output a heat-conducting medium. The heat-conducting medium is transferred through the first delivery tube 100 and returns into the first heat exchanger 50. When the heat-conducting medium is transferred through the first delivery tube 100, the heat-conducting medium performs heat exchange with the preheater 90 through the side wall of the side wall of the first delivery tube 100 and the outer side wall of the preheater 90. The heat-conducting medium performs heat exchange with the reactor 10 through the side wall of the first delivery tube 100 and the outer side wall of the reactor 10. Specifically, the middle portion of the first delivery tube 100 is configured to wrap around the outer side wall of the preheater 9 and the outer side wall of the reactor 10 to achieve the heat exchange between the first heat exchanger 50 and the preheater 90 and the heat exchange between the first heat exchanger 50 and the reactor 10.

Referring to the embodiment shown in FIG. 1, a gas flow controller 110 is provided between the pressure regulating valve 40 and the reactor 10. The gas flow controller 110 is configured to control a volumetric flow rate of the second raw material. Specifically, the volumetric flow rate refers to the mass of fluid flowing through an effective cross section of a closed pipe or an open tank per unit time. The gas flow controller is provided between the pressure regulating valve 40 and the one-way valve 80.

Referring to the embodiment shown in FIG. 1, the continuous synthesis system further includes a dryer 120, which is provided between the pressure regulating valve 40 and the reactor 10, and configured to dry the second raw material. Specifically, since the gas flow controller 110 will be easily damaged under the exposure to the liquid, the dryer 120 dries the second raw material to avoid the damage to the gas flow controller 110 caused by the moisture contained in the second raw material. In this embodiment, the dryer 120 is provided between the pressure regulating valve 40 and the gas flow controller 110.

Referring to the embodiment shown in FIG. 1, the continuous synthesis system further includes a safety valve 130. The safety valve 130 is provided between the pressure regulating valve 40 and the reactor 10. When the pressure of the continuous synthesis system is too high, the safety valve 130 is configured to relieve pressure. In this embodiment, the safety valve 130 is provided between the gas flow controller 110 and the one-way valve 80.

Specifically, the safety valve 130 includes a first end, a second end and a third end, all of which are provided spaced apart. The first end is connected to the gas flow controller 110, the second end is connected to the one-way valve 80, and the third end is connected to the external environment. When the pressure of the continuous synthesis system is normal, the first end is configured to be in communication with the second end of the safety valve 130, so as to enable normal transportation of the second raw material. When the pressure of the continuous synthesis system is excessively high due to system fault or blockage or any other reasons, the first end is configured for communication with the second end of the safety valve 130 to discharge the second raw material, so as to avoid a continuous rise of the pressure in the continuous synthesis system.

Referring to the embodiment shown in FIG. 1, the continuous synthesis system further includes a separator 140. One side of a top end of the separator 140 is connected to an end of the back pressure valve 60 away from the reactor 10, and the other side of the top end of the separator 140 is connected to a tail gas treatment device 1. Specifically, the products generated in the reactor 10 e.g., urea and hydrogen sulfide, enter the separator 140 through the back pressure valve 60. A non-gas product, that is, urea solution remains at a bottom of the separator 140, while the gas products (hydrogen sulfide gas, ammonia gas), which are lighter and not dissolved in the methanolamine, enter the tail gas treatment device 1 from the top of the separator 140 for tail gas treatment. In this embodiment, the separator 140 is a gas-liquid-solid multi-phase separator. The tail gas treatment device 1 is an external device. In other embodiments, the tail gas treatment device 1 may also be a part of the continuous synthesis system.

Referring to the embodiment shown in FIG. 1, a bottom end of the separator 140 is connected to a product collecting tank 2. The non-gas product (urea) at the bottom of the separator 140 is transferred to the product collecting tank 2 for collection. In this embodiment, the product collecting tank 2 is an external device. In other embodiments, the product collecting tank 2 may also be a part of the continuous synthesis system.

Referring to the embodiment shown in FIG. 1, the continuous synthesis system further includes a ball valve 150. One end of the ball valve 150 is connected to the bottom end of the separator 140, and the other end of the ball valve 150 is connected to the product collecting tank 2. The ball valve 150 is opened and closed to respectively control the conduction and blocking between the separator 140 and the product collecting tank 2. Specifically, when the reaction starts, the ball valve 150 is closed. When the product in the separator 140 reaches a certain level, the ball valve 150 is opened to allow the product to be continuously transferred from the separator 140 to the product collecting tank 2.

Referring to the embodiment shown in FIG. 1, the continuous synthesis system further includes a gas condensation dryer 160. A bottom end of the gas condensation dryer 160 is connected to a top end of the separator 140, and a top end of the gas condensation dryer 160 is connected to the tail gas treatment device 1 for tail gas treatment. Specifically, the gas (hydrogen sulfide gas) in the separator 140 is transferred to the tail gas treatment device 1 via the gas condensation dryer 160. The gas condensation dryer 160 is provided, such that when the gas (hydrogen sulfide gas) passes through the gas condensation dryer 160, the moisture contained in the gas is subjected to condensation and separation from the gas, and then flows back into the separator 140, thereby reducing the loss of non-gas (urea).

Referring to the embodiment shown in FIG. 1, the continuous synthesis system further includes a second heat exchanger 170. The second heat exchanger 170 is connected to the gas condensation dryer 160. The second heat exchanger 170 is connected to maintain a temperature in the gas condensation dryer 160 at a second preset temperature. The second preset temperature is lower than the first preset temperature. At the second preset temperature, the moisture contained in the gas (hydrogen sulfide gas) will be condensed and separated from the gas.

Referring to the embodiment shown in FIG. 1, the continuous synthesis system further includes a cooler 180. The cooler 180 is provided between the reactor 10 and the back pressure valve 60. The cooler 180 is configured to cool the target product output from the reactor 10. Specifically, the cooler 180 is a tubular cooler 180. In this embodiment, the second heat exchanger 170 is connected to the cooler 180. The second heat exchanger 170 is configured to keep the temperature inside the cooler 180 at the second preset temperature.

Referring to the embodiment shown in FIG. 1, the continuous synthesis system further includes a second delivery tube 190. Both two ends of the second delivery tube 190 are respectively connected to the second heat exchanger 170 to form a circulation loop. A middle portion of the second delivery tube 190 is in contact with an outer side wall of the cooler 180 and an outer side wall of the gas condensation dryer 160, respectively. The second heat exchanger 170 is configured to output a heat-conducting medium. The heat-conducting medium is transferred through the second delivery tube 190 and returns to the second heat exchanger 170. When the heat-conducting medium is transferred through the second delivery tube 190, the heat-conducting medium performs heat exchange with the cooler through a side wall of the second delivery tube 190 and an outer side wall of the cooler 180, and the heat-conducting medium performs heat exchange with the gas condensing dryer 160 through the side wall of the second delivery tube 190 and the outer side wall of the gas condensing dryer 160. Specifically, the middle portion of the second delivery tube 190 is configured to wrap around the outer side wall of the cooler 180 and the outer side wall of the gas condensation dryer 160 to achieve the heat exchange between the second heat exchanger 170 and the cooler 180 and the heat exchange between the second heat exchanger 170 and the gas condensation dryer 160.

Referring to the embodiment shown in FIG. 1, the continuous synthesis system further includes a temperature sensor 200. The temperature sensor 200 is configured to detect the temperature of the continuous synthesis system, Specifically, according to the difference between the temperature detected by the temperature sensor 200 and the actual required temperature in this embodiment, the temperature of the first heat exchanger 50 is adjusted to keep the temperature of the system at the required temperature, e.g., to keep the temperature in the reactor 10 and the temperature in the preheater 90 at the first preset temperature.

Referring to the embodiment shown in FIG. 1, a plurality of temperature sensors 200 are provided. The plurality of temperature sensors 200 are configured to reliably detect the temperature of the continuous synthesis system. In this embodiment, the number of temperature sensors 200 is eleven. A first temperature sensor 200 is located between the feeding pump 30 and the preheater 90. A second temperature sensor 200 is located between the preheater 90 and the reactor 10. The first temperature sensor and the second temperature sensor 200 are configured to detect a temperature of the material (here is referred to the first raw material and the second raw material) before entering the preheater 90 and a temperature of the material after leaving the preheater 90. A third temperature sensor 200 is located at a front end of the reactor 10, and a fourth temperature sensor 200 is located at a rear end of the reactor 10. The third temperature sensor and the fourth temperature sensor 200 are configured to detect the temperature of the material just entering the reactor 10 and the temperature at which the material (here is referred to the pre-determined product) leaves the reactor 10. A fifth temperature sensor 200 is located on the first delivery tube 100 between the first heat exchanger 50 and the reactor 10, a sixth temperature sensor 200 is located on the first delivery tube 100 between the reactor 10 and the preheater 90, and a seventh temperature sensor 200 is located on the first delivery tube 100 between the preheater 90 and the first heat exchanger 50. The fifth temperature sensor, the sixth temperature sensor and the seventh temperature sensor 200 are respectively configured to detect the temperature of the heat-conducting medium at different positions of the first delivery tube 100 to obtain the heat transfer effect of the first heat exchanger 50 on the reactor 10 and the preheater 90. An eighth temperature sensor 200 is located between the cooler 180 and the back pressure valve 60. The eighth temperature sensor 200 is configured to detect the temperature of the material after leaving the cooler 180. A ninth temperature sensor 200 is located on the second delivery tube 190 between the second heat exchanger 170 and the cooler 180, a tenth temperature sensor 200 is located on the second delivery tube 190 between the cooler 180 and the gas condensing dryer 160, and an eleventh temperature sensor 200 is located on the second delivery tube 190 between the gas condensing dryer 160 and the second heat exchanger 170. The ninth temperature sensor, the tenth temperature sensor and the eleventh temperature sensor 200 are respectively configured to detect the temperature of the heat-conducting medium at different positions of the second delivery tube 190 to obtain the heat transfer effect of the second heat exchanger 170 on the cooler 180 and the gas condensing dryer 160.

Referring to the embodiment shown in FIG. 1, the continuous synthesis system further includes a pressure sensor 210. The pressure sensor 210 is configured to detect the pressure of the continuous synthesis system. Specifically, according to the difference between the pressure detected by the pressure sensor 210 and the required pressure provided herein, the conducting state of the safety valve 130 is adjusted, or the volumetric flow rate of the second raw material is adjusted via the gas flow controller 110, so as to maintain the pressure of the system at the required pressure.

Referring to the embodiment shown in FIG. 1, a plurality of pressure sensors 210 are provided. The plurality of pressure sensors 210 are configured to reliably detect the pressure of the continuous synthesis system. In this embodiment, the number of pressure sensors 210 is two, one pressure sensor 210 is provided between the one-way valve 80 and the tubular preheater 90 to detect the pressure of the second raw material before entering the tubular preheater 90, i.e., the pressure before the reaction. The other pressure sensor 210 is provided between the cooler 180 and the back pressure valve 60 to detect the pressure of the product output from the cooler 180, i.e., the pressure after the reaction, such that the two pressure sensors 210 cooperate to achieve the monitor of the pressure of the system.

As shown in FIG. 1, a workflow of the preparation of $^{13}$C-urea performed by the continuous synthesis system of urea is briefly described as follows.

Methanolamine and sulfur powder are added to the mixing buffer tank 20, and the agitating member 70 agitates the methanolamine and sulfur powder to form a homogeneous suspension. The feeding pump 30 transfers the suspension from the mixing buffer tank 20 to the reactor 10 via the preheater 90.

An external carbon monoxide tank provides $^{13}$CO. The $^{13}$CO is transferred to the reactor 10 through the pressure regulating valve 40, the dryer 120, the gas flow controller 110, the safety valve 130, the one-way valve 80 and the preheater 90 in sequence.

The suspension reacts with the $^{13}$CO in the reactor 10 to generate $^{13}$C-urea and hydrogen sulfide. The $^{13}$C-urea and hydrogen sulfide in the reactor 10 are sequentially transferred to the separator 140 through the cooler 180 and the back pressure valve 60. Since the hydrogen sulfide gas is lighter, the hydrogen sulfide gas moves upward in the separator 140 and enters the tail gas treatment device 1 for tail gas treatment through the gas condensing dryer 160. When the hydrogen sulfide gas passes through the gas condensation dryer 160, the moisture contained in the hydrogen sulfide gas (such as $^{13}$C-urea liquid) is subjected to condensation and separation from the hydrogen sulfide gas, and flows back into the separator 140. The $^{13}$C-urea liquid entering the separator 140 directly flows into the bottom of the separator 140. Then the $^{13}$C-urea flows into the product collecting tank through the ball valve 150, so as to obtain the $^{13}$C-urea. In addition, the plurality of temperature sensors 200 and the plurality of pressure sensors 210 monitor the temperature and the pressure of the continuous synthesis system of urea in real time. According to the data fed back by the plurality of temperature sensors 200 and the plurality of pressure sensors 210, the temperature and the pressure of the continuous synthesis system of urea are adjusted in real time by the first heat exchanger 50 and the gas flow controller 110, so as to keep the temperature and the pressure of the continuous synthesis system at the temperature and pressure required by the reaction.

The continuous synthesis system of urea provided herein has high integration, and enables precise control of the reaction parameters such as temperature, pressure and flow rate, such that it is easy to identify the fault in the event of system fault, facilitating fast maintenance.

Described above are merely preferred embodiments of the disclosure, which are not intended to limit the scope of the application. It should be understood that any replacements, modifications and changes made by those skilled in the art without departing from the spirit of the application shall fall within the scope of the present application defined by the appended claims.

What is claimed is:

1. A continuous synthesis system of urea, comprising:
a reactor;
a mixing buffer tank;
a feeding pump;
a pressure regulating valve;
a first heat exchanger; and
a back pressure valve;
wherein the mixing buffer tank is configured to accommodate a first raw material;
one end of the feeding pump is connected to the mixing buffer tank, and the other end of the feeding pump is connected to the reactor; the feeding pump is configured to pump the first raw material in the mixing buffer tank to the reactor;
the pressure regulating valve is connected to the reactor; the pressure regulating valve is configured to transfer a second raw material to the reactor and regulate a pressure of the second raw material; the second raw material is gaseous; and the reactor is configured for reaction of the first raw material and the second raw material to generate a target product;
the first heat exchanger is connected to the reactor; and the first heat exchanger is configured to regulate a temperature inside the reactor to a first preset temperature;
the back pressure valve is connected to an end of the reactor away from the feeding pump; and the back pressure valve is configured to maintain a pressure of the continuous synthesis system at a preset pressure; and
the reactor is configured to be oscillatable to fully mix the first raw material and the second raw material in the reactor.

2. The continuous synthesis system of claim 1, wherein the reactor comprises a first circular tube and a second circular tube; the second circular tube is provided inside the first circular tube; a side wall of the second circular tube is provided with a plurality of through holes; and the first circular tube is configured to be radially swingable to drive the second circular tube to move back and forth inside the first circular tube.

3. The continuous synthesis system of claim 1, wherein the mixing buffer tank is provided with an agitating member; and the agitating member is configured to be axially rotatable to agitate the first raw material.

4. The continuous synthesis system of claim 1, wherein a one-way valve is provided between the pressure regulating valve and the reactor; and the second raw material is configured to be transferred to the reactor through the pressure regulating valve and the one-way valve in sequence.

5. The continuous synthesis system of claim 1, further comprising:
a preheater;
wherein a first end of the preheater is connected to the reactor, and a second end of the preheater is connected to the feeding pump; the preheater is connected to the first heat exchanger; and the first heat exchanger is configured to regulate a temperature inside the preheater to the first preset temperature.

6. The continuous synthesis system of claim 1, wherein a gas flow controller is provided between the pressure regulating valve and the reactor; and the gas flow controller is configured to control a volumetric flow rate of the second raw material.

7. The continuous synthesis system of claim 1, further comprising:
a separator;
wherein one side of a top end of the separator is connected to an end of the back pressure valve away from the reactor, and the other side of the top end of the separator is connected to a tail gas treatment device.

8. The continuous synthesis system of claim 7, further comprising:
a gas condensation dryer;
wherein a bottom end of the gas condensation dryer is connected to the top end of the separator, and a top end of the gas condensation dryer is connected to the tail gas treatment device.

9. The continuous synthesis system of claim 1, wherein the continuous synthesis system further comprises at least one of a dryer, a cooler, a temperature sensor and a pressure sensor;
wherein the dryer is provided between the pressure regulating valve and the reactor; and the dryer is configured to dry the second raw material;
the cooler is provided between the reactor and the back pressure valve; and the cooler is configured to cool the target product output from the reactor;
the temperature sensor is configured to detect a temperature of the continuous synthesis system; and
the pressure sensor is configured to detect a pressure of the continuous synthesis system.

* * * * *